United States Patent [19]
Cherry

[11] Patent Number: 6,022,044
[45] Date of Patent: Feb. 8, 2000

[54] SUPPORT DEVICE FOR A VEHICLE OCCUPANT SAFETY APPARATUS

[75] Inventor: Rodger M. Cherry, Grosse Pointe Woods, Mich.

[73] Assignee: TRW Vehicle Safety Systems Inc., Lyndhurst, Ohio

[21] Appl. No.: 09/282,014

[22] Filed: Mar. 29, 1999

[51] Int. Cl.[7] .................................................. B60R 21/22
[52] U.S. Cl. .................................. 280/730.2; 280/728.2; 280/730.1
[58] Field of Search ............................. 280/730.2, 728.2, 280/728.1, 730.1

[56] References Cited

U.S. PATENT DOCUMENTS 5,791,683  8/1998  Shibata et al. .
5,884,937  3/1999  Yamada .
5,899,486  5/1999  Ibe .

*Primary Examiner*—Eric Culbreth
*Attorney, Agent, or Firm*—Tarolli, Sundheim, Covell, Tummino & Szabo L.L.P.

[57] ABSTRACT

A vehicle occupant safety apparatus (10) includes an inflatable cushioning device (14), that has a deflated condition and an inflated condition in which the cushioning device (14) is located between the vehicle occupant and the side structure (16) of the vehicle (12). The vehicle occupant safety apparatus (10) also includes a fill tube (22) that has a portion (31) located in the cushioning device (14) and that directs inflation fluid into the cushioning device to inflate it. The vehicle occupant safety apparatus (10) further includes a support device (32) for supporting the fill tube (22) and the cushioning device (14) in the vehicle (12). The support device (32) includes a portion (66) that attaches to the fill tube (22) and an initial connector (42) that supports the fill tube (22) on the side structure (16) of the vehicle (12). The initial connector (42) allows the fill tube (22) to be moved to a desired position relative to the side structure (16) of the vehicle (12). The support device (32) includes a portion (52) for receiving a final connector (46) to fixedly connect the fill tube (22) and cushioning device (14) to the side structure (16) of the vehicle (12) in the desired position.

7 Claims, 2 Drawing Sheets

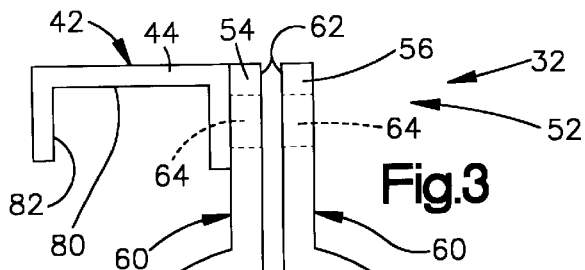
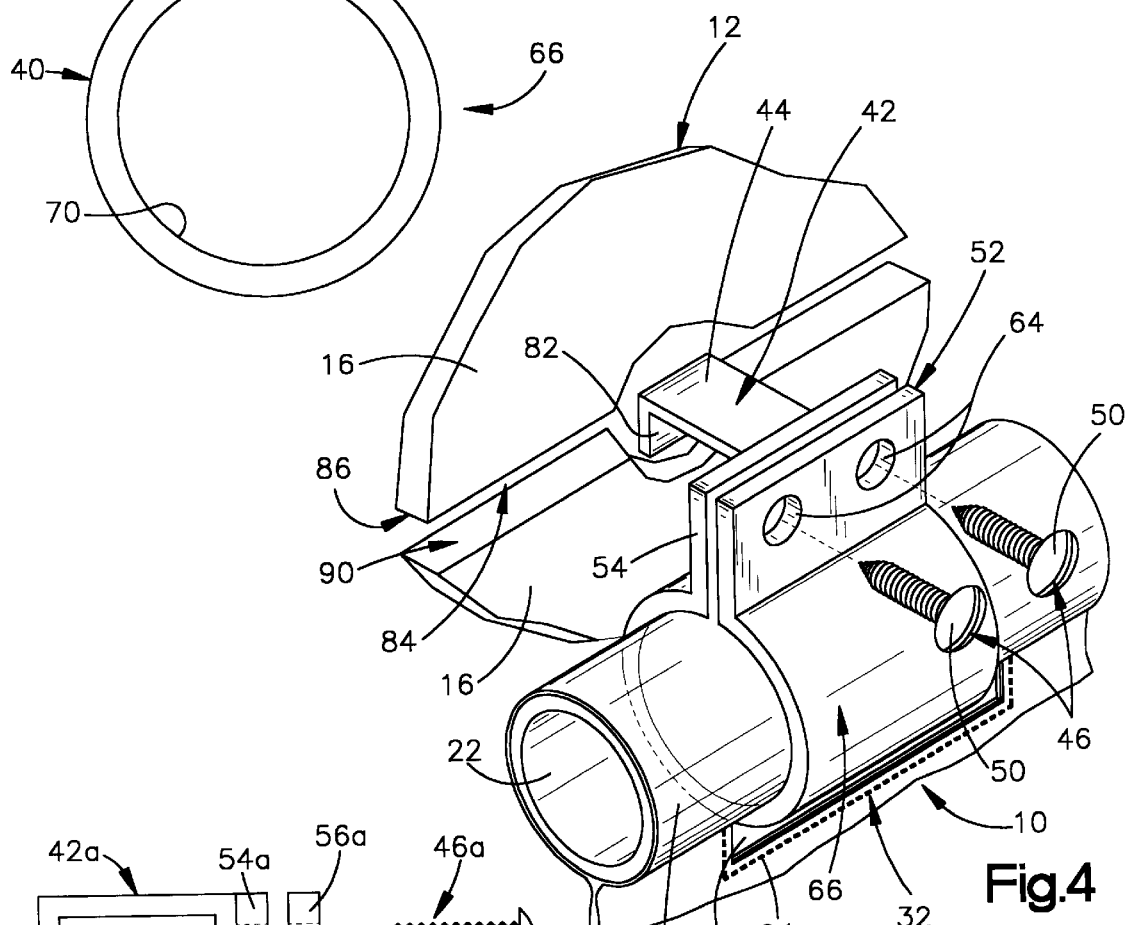
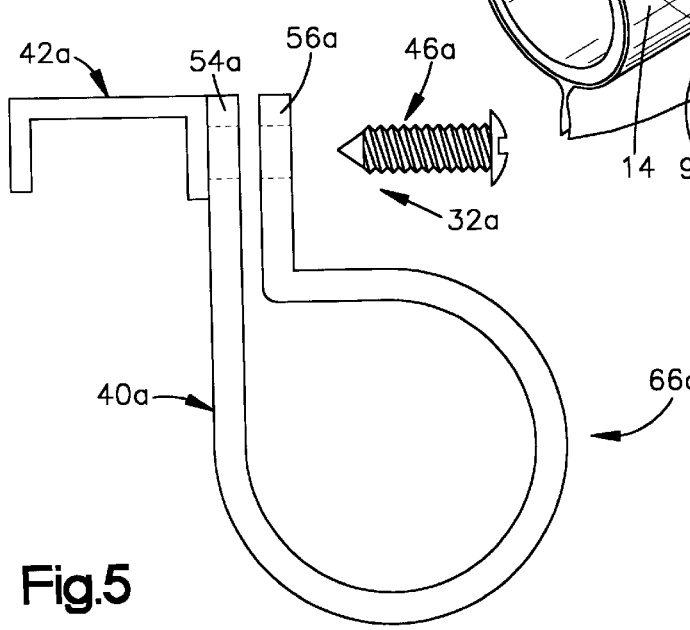

SUPPORT DEVICE FOR A VEHICLE OCCUPANT SAFETY APPARATUS

BACKGROUND OF THE INVENTION

1. Technical Field

The present invention relates to a vehicle occupant safety apparatus. In particular, the present invention relates to a support device for an inflatable cushioning device that helps to protect a vehicle occupant in the event of a side impact to a vehicle and/or a vehicle rollover.

2. Description of the Prior Art

It is known to inflate a cushioning device to help protect a vehicle occupant in the event of a vehicle collision. A cushioning device which is inflatable from the roof of the vehicle downward inside the passenger compartment between a vehicle occupant and the side structure of the vehicle in the event of a side impact or rollover is also known. The cushioning device is inflated from a deflated condition by inflation fluid directed from an inflator to the cushioning device through a fill tube.

The known cushioning device is stored in a folded, deflated condition in a housing. A support device such as a clamp or bracket is used to connect the fill tube, the housing and the cushioning device to the vehicle. When installing a known cushioning device, fastener apertures in the support device must be aligned with locations in the vehicle which receive fasteners. The installer may encounter difficulty in achieving proper alignment of the fastener apertures and the locations in the vehicle which receive the fasteners.

SUMMARY OF THE INVENTION

The present invention relates to a vehicle occupant safety apparatus for helping to protect an occupant of a vehicle having a side structure. The vehicle occupant safety apparatus includes an inflatable cushioning device having a deflated condition and having an inflated condition. In the inflated condition, the cushioning device is located between the vehicle occupant and the side structure of the vehicle. The vehicle occupant safety apparatus also includes a fill tube. The fill tube has a portion located in the cushioning device, and the fill tube directs fluid into the cushioning device to inflate the cushioning device.

The vehicle occupant safety apparatus further includes a support device for supporting the fill tube and the cushioning device in the vehicle. The support device has a portion which attaches to the fill tube. The support device also includes an initial connector that supports the fill tube on the side structure of the vehicle and allows the fill tube to be moved to a desired position relative to the side structure of the vehicle. The support device also includes a portion for receiving a final connector to fixedly connect the fill tube and cushioning device to the side structure of the vehicle in the desired position relative to the side structure of the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is an end elevational view of a support device which forms a portion of the vehicle occupant safety apparatus of FIG. 1;

FIG. 4 is a fragmentary perspective view depicting the installation of the support device which forms part of the vehicle occupant safety apparatus of FIG. 1; and FIG. 5 is an end elevational view of a second embodiment of the support device which forms part of the vehicle occupant safety apparatus of FIG. 1.

DESCRIPTION OF PREFERRED EMBODIMENTS

Figure 1:
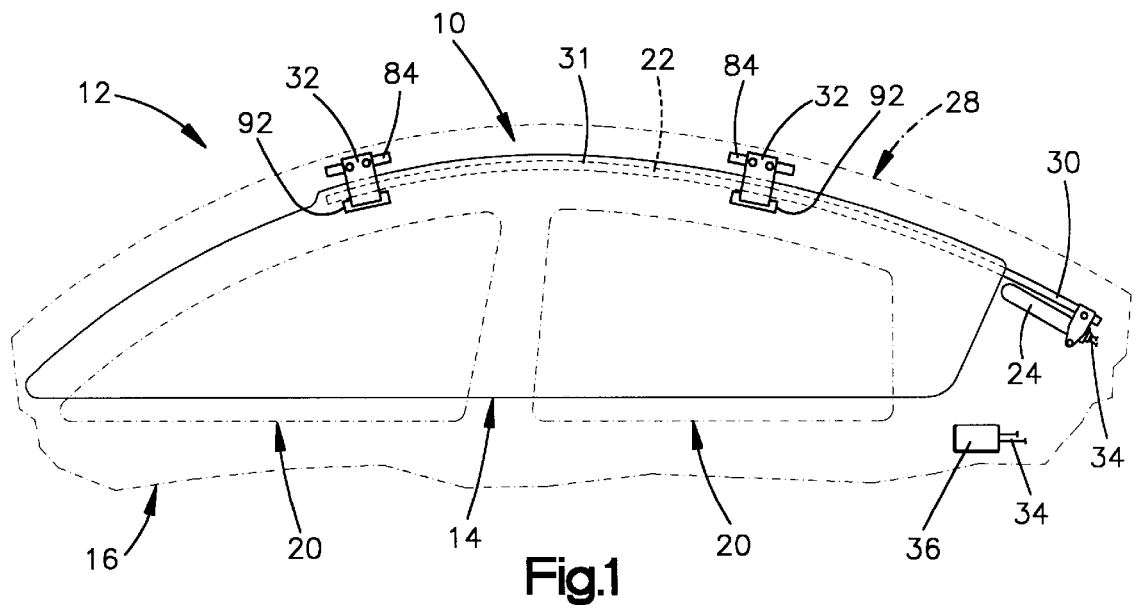
FIG. 1 is a schematic view of a vehicle occupant safety apparatus constructed in accordance with a first embodiment of the present invention.

As representative of the present invention, a vehicle occupant safety apparatus 10 for helping to protect an occupant of a vehicle 12 is shown in FIG. 1. The vehicle occupant safety apparatus 10 includes an inflatable cushioning device 14. The cushioning device 14 is mounted adjacent to the side structure 16 of the vehicle 12. The side structure 16 of the vehicle 12 includes side windows 20. The cushioning device 14 is inflated upon actuation of an inflator 24. The inflator 24 is connected in fluid communication with the cushioning device 14 through a fill tube 22. When inflated, the cushioning device 14 becomes located between the vehicle occupant and the side structure 16 of the vehicle 12 to help to protect an occupant of the vehicle 12 in the event of a side impact to the vehicle and/or a vehicle rollover.

Figure 2:
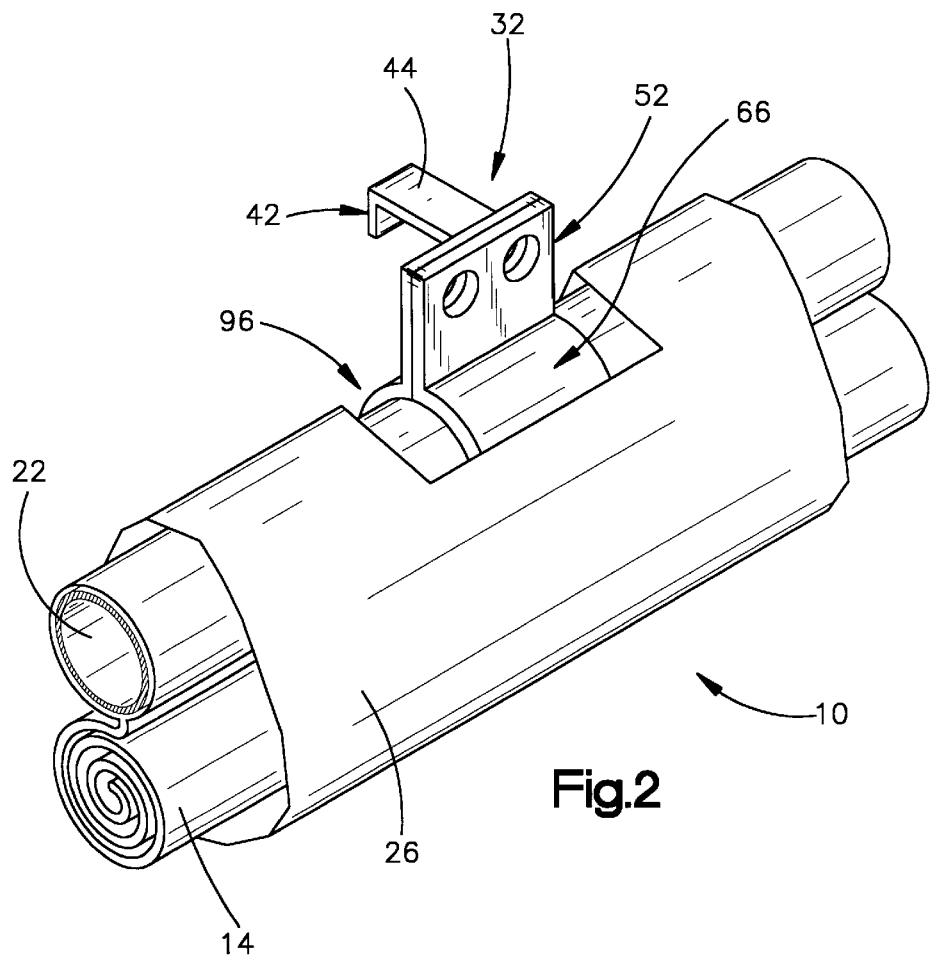
FIG. 2 is a perspective view of a portion of the vehicle occupant safety apparatus of FIG. 1.

The vehicle occupant safety apparatus 10 includes a housing 26 (FIG. 2) that stores the cushioning device 14 in a deflated condition. The housing 26 is not shown in FIG. 1. The housing 26 opens upon the inflation of the cushioning device 14. The fill tube 22, the deflated cushioning device 14, and housing 26 have an elongated configuration and extend along the roof 28 (FIG. 1) of the vehicle 12 and along the side structure 16 of the vehicle 12 above the side windows 20.

The fill tube 22 has a first end portion 30 for receiving fluid from the inflator 24. The fill tube 22 has a second end portion 31 which is disposed in the cushioning device 14. The second end portion 31 of the fill tube 22 has a plurality of openings (not shown) that provide fluid communication between the fill tube 22 and the cushioning device 14.

The inflator 24 preferably contains a stored quantity of pressurized inflation fluid (not shown) in the form of a gas to inflate the cushioning device. The inflator 24 alternatively could contain a combination of pressurized inflation fluid and ignitable material for heating the inflation fluid, or could be a pyrotechnic inflator which uses the combustion of gas-generating material to generate inflation fluid. Lead wires 34 extend from one end of the inflator 24.

The vehicle 12 includes a sensor mechanism 36 (shown schematically in FIG. 1) for sensing a side impact to the vehicle 12 and/or a rollover of the vehicle 12. For example, in the event of a side impact to the vehicle 12 of a magnitude greater than a predetermined threshold value, the sensor mechanism 36 causes an electrical signal to be sent over the lead wires 34 to the inflator 24. The electrical signal causes the inflator 24 to be actuated in a known manner. The inflator 24 discharges fluid under pressure into the fill tube 22. The fill tube 22 directs the fluid into the cushioning device 14. The cushioning device 14 inflates under the pressure of the inflation fluid into a position between the side structure 16 of the vehicle 12 and any occupants of the vehicle 12.

A support device 32 connects the vehicle occupant safety apparatus 10 to the side structure 16 of the vehicle 12. As illustrated in FIG. 3, the support device 32 includes a clamp 40 which is constructed of a single length of metal or plastic material. A fastener portion 52 of the clamp 40 is defined by a first fastener flange 54 and a second fastener flange 56. The first fastener flange 54 and second fastener flange 56 each have an outer flange surface 60 and an inner flange surface 62. The first fastener flange 54 and second fastener flange 56 each have a pair of fastener holes 64 extending through the flange material. The inner flange surfaces 62 lie in an opposing fashion with the fastener holes 64 on the first fastener flange 54 aligned with the fastener holes 64 on the second fastener flange 56. A clamping portion 66 of the clamp 40 is generally circular in shape and has an inner clamping surface 70 which clamps against the outer surface of the fill tube 22.

The clamping portion 66 of the support device 32 normally has an open condition wherein the inner flange surfaces 62 do not physically engage one another. In the normal open condition, the inside diameter of the clamping portion 66 is larger than the outside diameter of the fill tube 22. This enables the clamping portion 66 to be slid onto the fill tube 22.

As a feature of the present invention, the support device 32 includes an initial connector 42 for initially positioning the vehicle occupant safety apparatus 10 on the side structure 16 of the vehicle 12. The initial connector 42 is constructed as a hook 44 to support the clamp 40. The hook 44 has a generally L-shaped configuration and includes a hook support surface 80 on one leg of the L-shape and a hook retaining surface 82 on the other leg of the L-shape. The hook 44 is fastened to the outer flange surface 60 of the first fastener flange 54 and extends from the surface 60 in a generally perpendicular direction. Although the hook 44 is a separate item that is fastened, such as by a weld, to the clamp 40 in the illustrated embodiment, the hook 44 and clamp 40 could alternatively be formed from a single piece of material.

Assembly of the fill tube 22, cushioning device 14, housing 26 and support device 32 is required prior to installation in the vehicle 12. The fill tube 22 is inserted into the cushioning device 14. The cushioning device 14 includes clamp receiving apertures 92 spaced along its length. Each clamp receiving aperture 92 extends entirely through the cushioning device 14 and has a tightly stitched sew line 94 which completely encircles the aperture. The sew line 94 helps to block leakage of the inflation fluid from the cushioning device 14 when the cushioning device 14 is inflated.

The first and second fastener flanges 54 and 56 of the support device 32 are moved apart and the first fastener flange 56 is inserted through an aperture 92 in the cushioning device 14. The clamping portion 66 is located so as to extend through the aperture 92 and encircle the fill tube 22. Material of the cushioning device 14 is interposed between the clamping portion 66 and the fill tube 22.

The housing 26 is then positioned around the cushioning device 14 and the fill tube 22. The housing 26 is cut away at locations 96 along its length. The spacing of the cut away locations 96 in the housing 26 and the clamp apertures 92 in the cushioning device 14 is such that the cut away locations 96 coincide with the clamp apertures 92. The cut away locations 96 thus leave the cushioning device 14, fill tube 22 and clamp apertures 92 exposed along the length of the assemblage.

When the clamp 40 is positioned with the clamping portion 66 passing through the clamp aperture 92, the clamp 40 loosely engages the fill tube 22 and cushioning device at the cut away locations 96 of the housing 26, and the support device 32 projects from the assemblage through the cut away locations 96 in the housing 26.

A plurality of support devices 32 may be used to support the fill tube 22, cushioning device 14 and housing 26 on the vehicle 12. As shown in FIG. 1, two support devices 32 are used. Thus, the housing 26 and cushioning device 14 include two cut away locations 96 and two clamp apertures 92, respectively.

Once assembled, the vehicle occupant safety apparatus 10 is ready to be installed in the vehicle 12. As best shown in FIG. 4, the vehicle occupant safety apparatus 10 is initially supported on the vehicle 12 by the initial connectors 42, i.e., the hooks 44 of the support devices 32. The hooks 44 of the support devices 32 are inserted into respective slots 84 in the side structure 16 of the vehicle 12. Each slot 84 has an upper slot surface 86 located opposite and extending parallel to a lower slot surface 90. The distance between the upper slot surface 86 and the lower slot surface 90 is such that the hook 44 can be maneuvered to enter the slot 84.

Once the hooks 44 have been inserted into the slots 84, the hook support surfaces 80 (FIG. 3) engage the lower slot surfaces 90 (FIG. 4) to cause the vehicle occupant safety apparatus 10 to be supported by the lower slot surfaces 90. The hook retaining surfaces 82 engage an inner surface (not shown) of the side structure 16 of the vehicle 12. The hook retaining surfaces 82 prevent the support devices 32 from being pulled out of the slots 84 by the weight of the fill tube 22, cushioning device 14 and housing 26.

The fill tube 22, cushioning device 14 and housing 26 can be adjusted to a desired position relative to the side structure 16 of the vehicle 12. The length of each slot 84, as measured in the direction of forward vehicle travel, is greater than the width of each hook 44. The thickness of each hook 44 is less than the height of each slot 84. Therefore, the hooks 44 can be manually moved along the lengths of the slots 84 and can be moved vertically in the slots 84 until the openings 64 are aligned with locations, such as corresponding openings, in the side structure 16 of the vehicle 12 where fasteners are to be received. The hook 44 of each support device 32 can be manually moved individually while the hook 44 of the other support device 32 supports the fill tube 22, cushioning device 14 and housing 26 on the side structure 16 of the vehicle 12.

Once a support device 32 has been moved to a desired position relative to the side structure 16 of the vehicle 12, the support device 32 is fixedly connected to the side structure 16 of the vehicle 12 by a final connector 46 which comprises threaded fasteners 50. The threaded fasteners 50 are inserted through the fastener holes 64 in the fastener portion 52 of the clamp 40 which are aligned with locations, such as openings, on the side structure 16 of the vehicle 12 to receive the fasteners 50.

As the threaded fasteners 50 are tightened, the fastener portion 52 of the clamp 40 is compressed between the threaded fasteners 50 and the side structure 16 of the vehicle 12. Also, as the threaded fasteners 50 are tightened, the first and second fastener flanges 54 and 56 are drawn together, causing a clamping force to be applied to the material of the cushioning device 14 interposed between the clamp 40 and the fill tube 22 and to the fill tube 22 by the clamping surface 70, thus securing the fill tube 22 within the support device 32. Thus, the support device 32 fixedly connects the fill tube 22, cushioning device 14 and housing 26 to the side structure 16 of the vehicle 12.

The threaded fasteners 50 are sheet metal screws that are attached directly to the side structure 16 of the vehicle 12. Alternative fasteners, however, may also be used.

In a second embodiment of the present invention, the support device 32 is of a slightly altered construction. The second embodiment of the present invention is illustrated in FIG. 5. Since the second embodiment of the invention is similar to the first embodiment of the invention illustrated in FIGS. 1–4, numerals similar to those of FIGS. 1–4 will be utilized in FIG. 5 to identify similar components, the suffix letter "a" being associated with the numerals of FIG. 5 to avoid confusion.

Referring now to FIG. 5, a support device 32a connects the vehicle occupant safety apparatus 10 (FIG. 1) to the side structure 16 of the vehicle 12. The construction of the support device 32a (FIG. 5), in particular the clamp 40a, differs from the construction of the support device 32 (FIG. 3). In the embodiment of FIG. 5, the first and second fastener flanges 54a and 56a (FIG. 5) are offset with respect to the clamping portion 66a rather than centered with respect to the clamping portion 66 as is the case with the embodiment of FIGS. 1–4. The first and second fastener flanges 54a and 56a (FIG. 5) extend in a tangential direction from the outside of the circular clamping portion 66a, as opposed to extending in a radial direction from the center of the clamping portion. Notwithstanding the differences in the construction of the clamp 40a (FIG. 5), the support device 32a connects the vehicle occupant safety apparatus 10 (FIG. 1) to the side structure 16 of the vehicle 12, using the initial connectors 42a (FIG. 5) and final connectors 46a, in a manner identical to that of the support device 32 (FIG. 4).

From the above description of the invention, those skilled in the art will perceive improvements, changes and modifications in the invention. Such improvements, changes and modifications within the skill of the art are intended to be covered by the appended claims.

Having described the invention, I claim:

1. A vehicle occupant safety apparatus for helping to protect an occupant of a vehicle having a side structure, said apparatus comprising:

a cushioning device having a deflated condition and having an inflated condition in which said cushioning device is inflated between an occupant of a vehicle and the side structure of the vehicle;

a fill tube having a portion located in said cushioning device, said fill tube directing inflation fluid into said cushioning device to inflate said cushioning device; and a support device for supporting said fill tube and said cushioning device in the vehicle, said support device having a portion attaching to said fill tube, said support device including an initial connector that supports said fill tube on the side structure of the vehicle and allows said fill tube to be moved to a desired position relative to the side structure of the vehicle, said support device also including a portion for receiving a final connector to fixedly connect said support device and said fill tube to the side structure of the vehicle in a desired position relative to the side structure of the vehicle.

2. A vehicle occupant safety apparatus as defined in claim 1 wherein said initial connector comprises a part of said support device which is adapted to be located in a slot in the side structure of the vehicle, said part being narrower than said slot as measured in a direction of forward travel of the vehicle, thus permitting said part to be moved relative to the vehicle in the direction of forward travel of the vehicle, said part also being thinner than said slot as measured in a direction perpendicular to the forward direction of travel of the vehicle, thus permitting said part to be moved relative to the vehicle in a direction perpendicular to the forward direction of travel of the vehicle.

3. A vehicle occupant safety apparatus as defined in claim 1 further including a housing that encloses said fill tube and said cushioning device when in said deflated condition.

4. A vehicle occupant safety apparatus as defined in claim 1 wherein a plurality of said support devices are arranged in an array along said fill tube.

5. A vehicle occupant safety apparatus as defined in claim 1 wherein said final connector comprises at least one threaded fastener which extends through an opening in said support device.

6. A vehicle occupant safety apparatus as defined in claim 1 wherein said support device comprises a clamp portion encircling said fill tube and a hook portion fixedly connected to said clamp portion, said clamp portion and said hook portion comprising said initial connector.

7. A vehicle occupant safety apparatus as defined in claim 6 wherein said clamp portion has openings for receiving threaded fasteners which comprise said final connector, said threaded fasteners when tightened into locations in the side structure of the vehicle causing said clamp portion to tightly clamp against said fill tube.

* * * * *